United States Patent

Herrera

Patent Number: 5,558,885
Date of Patent: Sep. 24, 1996

[54] INSERTS FOR SHEETING HEAD

[75] Inventor: Michael L. Herrera, Pomona, Calif.

[73] Assignee: Casa Herrera, Inc., Los Angeles, Calif.

[21] Appl. No.: 329,330

[22] Filed: Oct. 26, 1994

[51] Int. Cl.⁶ ............................................. A21C 3/02
[52] U.S. Cl. ................................. 425/363; 425/239
[58] Field of Search ................................. 425/363, 239; 426/502, 517

[56] References Cited

U.S. PATENT DOCUMENTS

| | | | |
|---|---|---|---|
| 3,611,486 | 10/1971 | Fox | 425/363 |
| 3,985,488 | 10/1976 | Hoffmann | 425/363 |
| 4,043,731 | 8/1977 | Kratzmann et al. | 425/366 |
| 4,925,382 | 5/1990 | Bergendahl et al. | 425/367 |
| 5,088,910 | 2/1992 | Goforth et al. | 425/142 |
| 5,180,593 | 1/1993 | Mistretta et al. | |

Primary Examiner—Robert J. Warden
Assistant Examiner—E. Leigh Dawson
Attorney, Agent, or Firm—Price, Gess & Ubell

[57] ABSTRACT

An improved hopper structure is described for sheeting heads which use rollers to process dough into thin sheets. Inserts which are attached to the hopper endwalls are equipped with a tongue-in-groove structure to prevent dough from escaping. The edges of the hopper inserts are contoured to mate with the roller surfaces and bear a tongue seated in a circumferential groove in the roller. This arrangement ensures that the hopper endwall does not change position and does not deform.

8 Claims, 2 Drawing Sheets

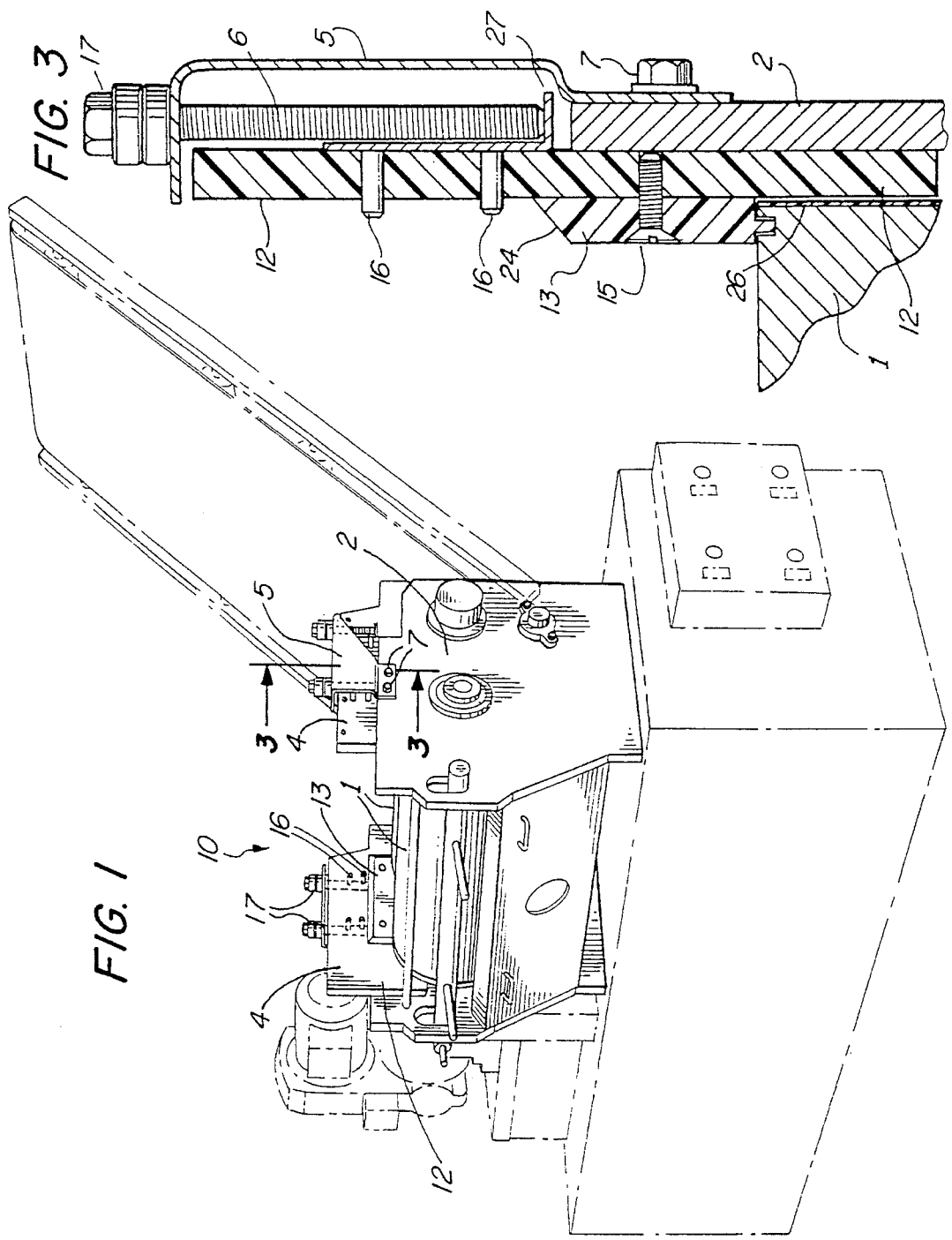

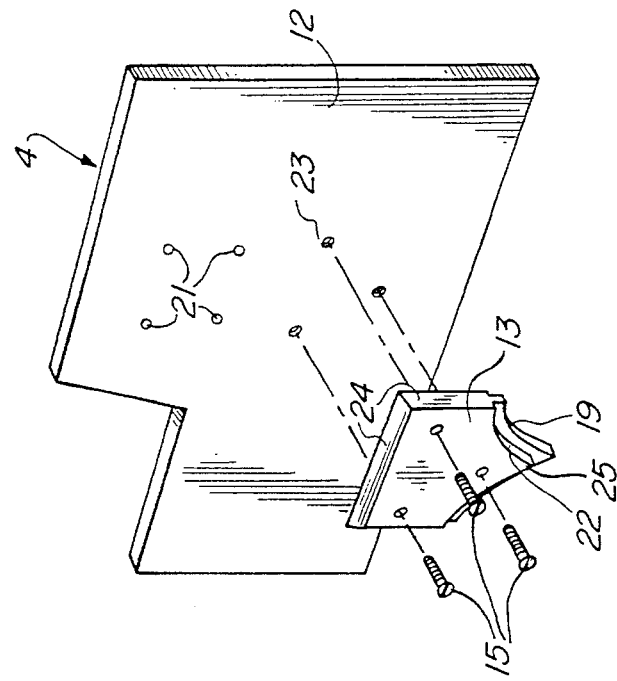
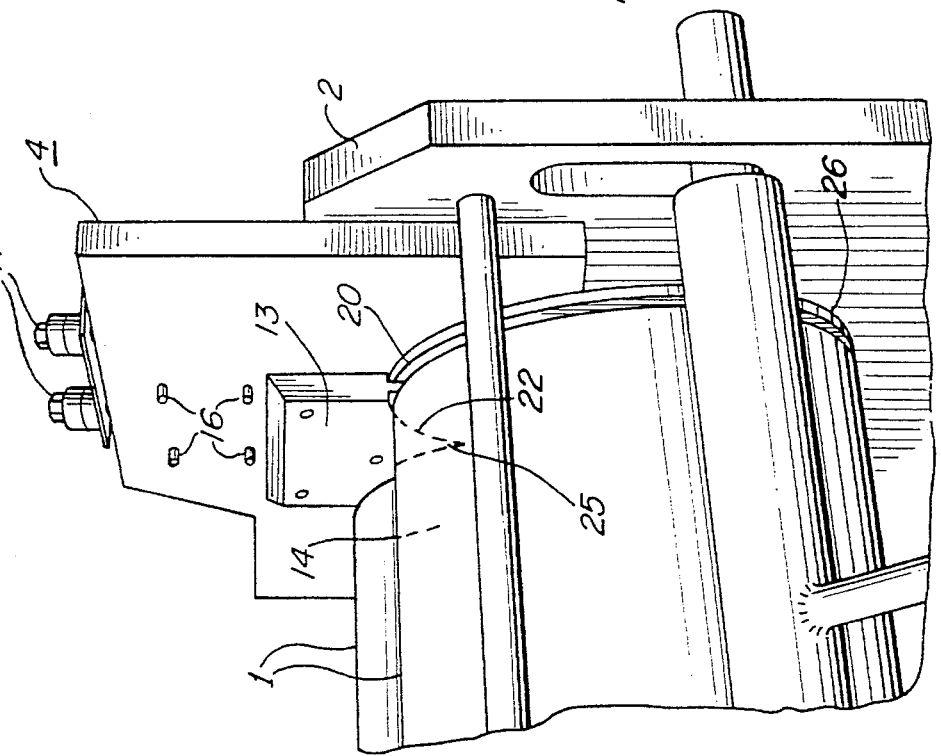

INSERTS FOR SHEETING HEAD

BACKGROUND OF THE INVENTION

1. Field of the Invention

The present invention relates to machinery for processing foods. In particular, the invention relates to a machine for processing dough into relatively thin sheets out of which are cut chips, tortillas, and like food products.

2. Description of Related Art

Tortillas are the indigenous "bread" of the New World civilizations. The major grain of the Americas was maize (corn). Since corn kernels lack the elastic gluten proteins of wheat, native Americans were not able to produce a leavened bread instead, they developed a technique in which dried maize is cooked with calcium carbonate or alkali to produce a sticky dough known as masa. Traditionally this dough was shaped by hand and baked on a stone comal or griddle. Today, special machines called sheeting heads form the masa into relatively thin sheets from which tortillas and other food products such as chips are cut.

The typical sheeting head comprises a hopper structure which contains the masa. The hopper comprises two endwalls and may also include two sidewalls. Masa dough is held in the space included by the hopper walls. At the bottom of the hopper is a pair of counterrotating parallel rollers which may also act as the hopper sidewalls. The rollers rotate on a horizontal axis drawing in the masa and forming it into a sheet. After the masa is squeezed between the two rollers, it is stripped off one of the rollers and transferred to the other roller, usually by a stripper wire. On the second roller the sheet of dough interacts with a rotary cutter which rotates in contact with that roller thereby cutting the dough into the desired shapes. The cut dough is then stripped from the sheeting roller and transferred to a conveyor belt, which carries it into an oven or other processing station.

The sheeting head is susceptible to a great many variations and improvements. The basic form of the device is, to some degree, dictated by the sticky, plastic masa dough. Because the dough is sticky, it must be physically stripped from the roller. Because the dough is plastic, it tends to expand outward as it's squeezed between the rollers. Thus, it has a tendency to escape from the hopper along the junction of the hopper endwalls with the rollers. This can be a considerable problem, as the dough can penetrate into the bearings and other machine parts. A prior art solution is to add an additional component to the endwalls of the hopper. An insert, which is contoured to match the upper surfaces of the rollers, is attached to the inner surface of the endwall and because of its shape, blocks escape of dough between the inner surface of the endwall and the end surfaces of the rollers.

Nevertheless, the plastic dough still is able to work its way under the contoured edges of the insert and wedge itself between the ends of the rollers and the endwall. As already mentioned, the insert is shaped to tightly contact the upper surfaces of the two rollers. Therefore, the insert comes to a narrow point-shaped tip which is inserted between the rollers. A buildup of dough could actually force the endwall to bend, thereby opening a gap and allowing even more dough to escape. The narrow tip of the insert is especially prone to deformation. To avoid such lateral motion of the endwalls, various mechanisms have been employed to exert an inward pressure on the endwalls.

One prior art method that attempts to minimize the escape of dough under the contoured edges of the insert can be seen in U.S. Pat. No. 5,180,593 to Mistretta et al. FIG. 9 of that patent shows the insert, there called a saddle, constructed with a lip which is intended to ride along a shoulder that has been cut into the end of the roller. The intent of this structure is to reduce the escape of the dough under the lip; however, the lip cannot prevent distortion of the insert caused by build up of dough and frictional heating.

OBJECTS AND SUMMARY OF THE INVENTION

It is an object of the present invention to provide an endwall structure that minimizes the problem of dough escape.

It is a further object of the present invention to provide an endwall structure that resists bowing and deformation without requiring a complex tensioning mechanism.

These and other objects are achieved by constructing a sheeting head in which the hopper endwall inserts are positively locked to the rollers by a tongue-in-groove structure that stabilizes the insert without hindering the rotation of the rollers. The endwall inserts are shaped to follow the curved surfaces of the rollers. The edges of the inserts which contact the roller bear a tongue-like projection which fits into a circumferential groove on the roller. This interlocking of the insert and the roller surface makes it very unlikely that dough will be able to escape under the edge of the insert. Furthermore, the tongue-in-groove structure prevents deformation of the insert particularly at the thin point where the insert penetrates between the two rollers.

Although the invention is described as a tongue on the insert and a corresponding groove on the roller surface, there is no reason why the reverse orientation will not operate. That is, the roller bears a ridge that fits into a groove in the insert.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 1 is a perspective view of a sheeting head;

FIG. 2 is a perspective view of a sheeting head showing the inside of the hopper area;

FIG. 3 is a cross-sectional view, taken along 3—3 of FIG. 1, showing the insert tongue and the roller groove; and FIG. 4 is an exploded view of an endwall showing the relation between the insert and the outer layer of the endwall.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide an improved design for sheeting head inserts that rotatably interlock with the rollers to prevent escape of dough and to prevent lateral motion of the endwalls.

FIG. 1 shows a sheeting head 10 that employs a hopper structure according to the present invention. A pair of counterrotating rollers 1 are mounted on a frame 2. The dough (not shown) to be processed is contained in the hopper area (not numbered) which comprises a space between the rollers 1 and bounded on either end by endwall 4. That is, the endwalls 4 are positioned at opposing ends of the rollers 1 to prevent escape of the dough.

The hopper endwalls 4 comprise flat sheets of metal or plastic, an inner surface 12 of which contacts the dough and the ends of the rollers 1. As shown in FIG. 2, the endwalls 4 are disposed between the ends of the rollers 1 and the frame 2. An insert 13 is attached to the inner surface 12 of the endwall 4 by three bolts 15 which pass through holes 23 in the endwall 4. This arrangement permits ready replacement of a worn or damaged insert 13.

As shown in FIG. 4, the insert 13 has an upper end that is rectangular in shape while its lower end tapers to a point 25. The edges 24 of the upper end of the insert 13 are beveled to minimize the sticking of dough. The edges 22 of the tapering point 25 are curved to match the curved roller surfaces when the tip 25 is in place between the two rollers (FIG. 2). The lower edges 22 of the insert 13 are contoured to contact the upper surfaces of the rollers 1 to prevent the escape of the dough.

Since the lower edges 22 of the inserts 13 contact the moving surface of the roller 1, the insert 13 is preferably made from a relatively friction-free material that is softer than the rollers to reduce roller wear. To further minimize wear between the roller 1 and the inner surface 12 of the endwall 4, the roller end can be covered by a plastic disc 26. Various types of plastics are adequate. The preferred material for the inserts 13 is a plastic certified for use in contact with food such as UHMW (ultra-high molecular weight plastic, a food grade plastic manufactured by Du Pont). The endwall 4 can also be advantageously constructed of UHMW.

To further prevent the escape of dough and to stabilize the position of the insert 13 the lower portion of the insert 13 also bears a tongue 19 designed to fit into a groove 20 on at least one of the rollers 1, thereby forming a tongue-in-groove structure (see FIG. 2). This structure virtually eliminates escape of dough under the insert edge 22 because to escape dough would have to navigate the tortuous path down into the groove 20, under the tight-fitting tongue 19 and up again on the other side. The tongue 19 also interlocks the endwalls 4 to the roller 1, thereby preventing any possible movement of the hopper endwalls 4 or of the insert 13. The narrow tip region 25 of insert 13 would be especially prone to deformation if not stabilized by the tongue-in-groove structure. It should be apparent to one skilled in the art that the tongue-and-groove can be applied to both or to either one of the rollers.

As long as the tongue 19 is held in the groove 20, the insert 13 will keep the endwall 4 in close proximity with the rollers 1. To this end a mechanical linkage is provided to keep the tongue 19 seated in the groove 20 by exerting force in a downward direction. As shown in FIG. 3, bolts 7 attach a bracket 5 to the frame 2 of the sheeting head 10. The bracket 5 is linked to the endwall 4 by means of a bolt 6 and an L-bracket 27. The endwall 4 has holes 21 to accommodate pins 16 of the L-bracket 27. When bolt head 17 is turned, the bolt 6 exerts force on the L-bracket 27. This force is transmitted by the pins 16 to the endwall 4 and the attached insert 13. Thus, tongue 19 is pressed into the groove 20. Bolt head 17 is adjusted to provide sufficient force to keep the tongue 19 in the groove 20 without providing excessive force which could increase friction and deform plastic parts.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An improved sheeting head for processing dough into thin sheets of uniform thickness, the sheeting head comprising:

a first and a second counterrotating roller, parallel and in a horizontal plane, for flattening and extruding dough;

a hopper structure to contain the dough and dispense it to the rollers, the hopper structure comprising endwalls at opposing ends of the rollers;

two inserts, one attached to an inner surface of each endwall, each insert with a tapering lower portion disposed to penetrate between the rollers with a first edge of the lower portion of the insert shaped to meet a surface of the first roller and a second edge of the lower portion of the insert shaped to meet a surface of the second roller;

a circumferential groove in one of the rollers;

a tongue located on at least one of the edges of the lower portion of the insert, the tongue sized and disposed for interacting with the circumferential groove forming a tongue-in-groove structure for preventing lateral deformation of the insert and escape of the dough under the edge of the insert;

a frame member for supporting the rollers; and adjustment means for connecting the endwalls to the frame member and for providing adjustable force to keep the tongue seated in the groove.

2. The sheeting head of claim 1, wherein the tongue is on the edge of the lower portion of the insert that meets the surface of the first roller.

3. The sheeting head of claim 1, wherein the tongue is on the edge of the lower portion of the insert that meets the surface of the second roller.

4. The sheeting head of claim 1, wherein the tongue is on the first and the second edges of the lower portion of the insert that meet the surface of the first and the second rollers, respectively.

5. The sheeting head of claim 1, wherein the insert is made of UHMW plastic material.

6. The sheeting head of claim 1, wherein the adjustment means comprises:

a bracket connected to the frame member;

an L-shaped member connected to the endwall by pins which extend from the L-shaped member through bores in the endwall; and a bolt engaged with the bracket, contacting the L-shaped member so that adjustment of the bolt will exert force on the L-shaped bracket and the endwall.

7. An improved sheeting head for processing dough into thin sheets of uniform thickness, the sheeting head comprising:

a first and a second counterrotating roller, parallel and in a horizontal plane, for flattening and extruding dough;

a hopper structure to contain the dough and dispense it to the rollers, the hopper structure comprising endwalls at opposing ends of the rollers;

two inserts of UHMW plastic, one attached to an inner surface of each endwall, each insert with a tapering lower portion disposed to penetrate between the rollers with a first edge of the lower portion of the insert shaped to meet a surface of the first roller and a second edge of the lower portion of the insert shaped to meet a surface of the second roller;

a circumferential groove in one of the rollers;

a tongue located on at least one of the edges of the lower portion of the insert, the tongue sized and disposed for interacting with the circumferential groove forming a tongue-in-groove structure for preventing lateral deformation of the insert and escape of the dough under the edge of the insert;

a frame member for supporting the rollers; and an adjustment device connecting the endwalls to the frame member and providing adjustable force to keep the tongue seated in the groove, the device comprising:
   a bracket connected to the frame member;
   an L-shaped member connected to the endwall by pins which extend from the L-shaped member through bores in the endwall;
and
   a bolt engaged with the bracket, contacting the L-shaped member so that adjustment of the bolt will exert force on the L-shaped bracket and the endwall.

8. An improved sheeting head for processing dough into thin sheets of uniform thickness, the sheeting head comprising:

a first and a second counterrotating roller, parallel and in a horizontal plane, for flattening and extruding dough;

a hopper structure to contain the dough and dispense it to the rollers, the hopper structure comprising endwalls at opposing ends of the rollers;

two inserts, one attached to an inner surface of each endwall, each insert with a tapering lower portion disposed to penetrate between the rollers with a first edge of the lower portion of the insert shaped to meet a surface of the first roller and a second edge of the lower portion of the insert shaped to meet a surface of the second roller;

a tongue-in-groove structure located along at least one of the edges of the lower portion of the insert where the insert meets the roller surfaces, the tongue-in-groove structure formed by interaction of a tongue with a groove in the roller, the tongue-in-groove structure interlocking the insert and the roller thereby preventing lateral deformation of the insert and the escape of dough from under the edge of the insert;

a frame member for supporting the rollers; and adjustment means for connecting the endwalls to the frame member and for providing adjustable force to maintain the tongue-in-groove structure.

\* \* \* \* \*